United States Patent
Handelman et al.

(10) Patent No.: US 11,695,476 B2
(45) Date of Patent: Jul. 4, 2023

(54) SYSTEM AND METHOD FOR OPTIMIZING OPTICAL COMMUNICATION FOR AUTONOMOUS VEHICLES

(71) Applicant: LAKURUMA SYSTEMS LTD., Mevasseret Zion (IL)

(72) Inventors: Amir Handelman, Hod Hasharon (IL); David Geva, Rosh-Haayin (IL)

(73) Assignee: LAKURUMA SYSTEMS LTD., Mevasseret Zion (IL)

(*) Notice: Subject to any disclaimer, the term of this patent is extended or adjusted under 35 U.S.C. 154(b) by 0 days.

(21) Appl. No.: 17/376,681

(22) Filed: Jul. 15, 2021

(65) Prior Publication Data

US 2021/0344423 A1    Nov. 4, 2021

Related U.S. Application Data

(63) Continuation of application No. PCT/US2020/013869, filed on Jan. 16, 2020.

(60) Provisional application No. 62/793,139, filed on Jan. 16, 2019.

(51) Int. Cl.
*H04B 10/112* (2013.01)
*G08G 1/052* (2006.01)

(52) U.S. Cl.
CPC ......... *H04B 10/1129* (2013.01); *G08G 1/052* (2013.01); *H04B 10/112* (2013.01)

(58) Field of Classification Search
None
See application file for complete search history.

(56) References Cited

U.S. PATENT DOCUMENTS

| | | | |
|---|---|---|---|
| 6,128,559 A | 10/2000 | Saitou et al. | |
| 6,507,366 B1 | 1/2003 | Lee | |
| 6,934,433 B2* | 8/2005 | Miyata | H04B 10/0797 385/48 |
| 7,040,435 B1 | 5/2006 | Lesesky et al. | |
| 7,295,925 B2 | 11/2007 | Breed et al. | |
| 9,547,986 B1 | 1/2017 | Curlander et al. | |
| 11,092,961 B2 | 8/2021 | Battles et al. | |
| 2008/0161986 A1* | 7/2008 | Breed | G01S 19/43 701/23 |

(Continued)

OTHER PUBLICATIONS

Christopher Poulton et al. "Long-Range LiDAR and Free-Space Data Communication with High-Performance Optical Phased Arrays". Article in IEEE Journal of Selected Topics in Quantum Electronics. Apr. 2019.

(Continued)

*Primary Examiner* — David W Lambert
(74) *Attorney, Agent, or Firm* — M&B IP Analysts, LLC

(57) ABSTRACT

A system and method for optimizing optical communication for autonomous vehicles, including: determining a predetermined route of a vehicle equipped with an optical communication device (OCD) including an array of micromirrors; determining a location of at least one infrastructure unit along the predetermined route; determining optimal angles for the array of micromirrors based on the predetermined route and the determined location of the at least one infrastructure unit to optimize optical communication between the OCD and the at least one infrastructure unit; and adjusting the array of micromirrors based on the determined optimal angles.

21 Claims, 4 Drawing Sheets

(56) References Cited

U.S. PATENT DOCUMENTS

2018/0041279 A1* 2/2018 Segura ............. H04B 10/25891
2021/0302621 A1* 9/2021 Brown ................... G06Q 50/28

OTHER PUBLICATIONS

International Search Report and Written Opinion of International Searching Authority for PCT/US2020/013869, ISA/RU, Moscow, Russia, dated: May 18, 2020.

Max Curran, Md. Shaifur Rahman, Himanshu Gupta, Kai Zheng, Jon Longtin, Samir R. Das, Thanvir Mohamed. "FSONet: A Wireless Backhaul for Multi-Gigabit Picocells Using Steerable Free Space Optics" Stony Brook University. Stony Brook, NY.

Murat Yuksel, Jayasri Akella, Shivkumar Kalyanaraman, Partha Dutta. "Free-space-optical mobile ad hoc networks: Auto-configurable building blocks". Published online: Apr. 17, 2007.

Navid Hamedazimi, Zafar Qazi, Himanshu Gupta, Vyas Sekar, Samir R. Das, Jon P. Longtin, Himanshu Shah, and Ashish Tanwer. "FireFly: A Reconfigurable Wireless Data Center Fabric Using Free-Space Optics". Stony Brook University. Carnegie Mellon University.

Q. Fan, M. Taheri, N. Ansari, J. Feng, R. Rojas-Cessa, M. Zhou, T. Zhang, "Reducing the Impact of Handovers in Ground-to-Train Free Space Optical Communications," in IEEE Transactions on Vehicular Technology, vol. 67, No. 2, pp. 1292-1301, Feb. 2018. https://ieeexplore.ieee.org/stamp/stamp.jsp?tp=&arnumber-8047326.

Kosuke Mori et al. "Fast Handover Mechanism for High Data Rate Ground-to-Train Free-Space Optical Communication System". Globecom 2014 Workshop.

Long Li et al. "High-Capacity Free-Space Optical Communications Between a Ground Transmitter and a Ground Receiver via a UAV Using Multiplexing of Multiple Orbital-Angular-Momentum Beams". Published online Dec. 12, 2017.

Mithin Mohan et al. "Sectorised base stations for FSO ground-totrain communications" IET Optoelectronics. Received on Nov. 19, 2019.

Q. Fan, M. Taheri, N. Ansari, J. Feng, R. Rojas-Cessa, M. Zhou, T. Zhang, "Reducing the Impact of Handovers in Ground-to-Train Free Space Optical Communications," in IEEE Transactions on Vehicular Technology, vol. 67, No. 2, pp. 1292-1301, Feb. 2018. URL: https://ieeexplore.ieee.org/stamp/stamp.jsp?tp=&arnumber=8047326.

Qiang Fan et al. "Reducing the Number of FSO Base Stations With Dual Transceivers for Next-Generation Ground-to-Train Communications". IEEE Transactions on Vehicular Technology, vol. 67, No. 11, Nov. 2018.

Qiang Fan. "Reducing the Impact of Handovers in Ground-to-Train Free Space Optical Communications". IEEE Transactions on Vehicular Technology, vol. 67, No. 2, Feb. 2018.

Sina Fathi-Kazerooni, et al. "Optimal Positioning of Ground Base Stations in Free-Space Optical Communications for High-Speed Trains". IEEE Transactions on Intelligent Transportation Systems, vol. 19, No. 6, Jun. 2018.

Yagiz Kaymak et al. "A Survey on Acquisition, Tracking, and Pointing Mechanisms for Mobile Free-Space Optical Communications". 2018.

* cited by examiner

SYSTEM AND METHOD FOR OPTIMIZING OPTICAL COMMUNICATION FOR AUTONOMOUS VEHICLES

CROSS-REFERENCE TO RELATED APPLICATIONS

This application is a continuation of an International Application PCT/US2020/013869 filed on Jan. 16, 2020. International Application PCT/US2020/013869 claims the benefit of U.S. Provisional Application No. 62/793,139 filed on Jan. 16, 2019, the contents of which are hereby incorporated by reference.

TECHNICAL FIELD

The present disclosure relates generally to autonomous vehicles, and more specifically to systems and methods of optimizing communication between autonomous vehicles and other vehicles or infrastructure, where the autonomous vehicles travel predetermined routes.

BACKGROUND

Autonomous vehicles use a host of sensors and computing algorithms to determine their surroundings and calculate appropriate responses to various scenarios in order to safely operate on a shared road without the input of a human driver. Such vehicles are becoming more economically viable due to recent technological advances. As these vehicles become more popular, they not only must capture and analyze their real-world surroundings, such as road obstacles, traffic signals, and the like, but also have to communicate with other vehicles in order to help prevent accidents and improve safety and efficiency, a process known as vehicle-to-vehicle (V2V) communication.

Additionally, many scenarios require communication between vehicles and infrastructure, such as traffic lights, electronic street signs, traffic cameras, and the like, known as vehicle-to-infrastructure (V2I) communication. In many cases, having a central infrastructure unit configured to communicate directly with multiple vehicles allows for the most efficient determination of prioritization of vehicles. For example, if multiple vehicles approach an intersection at the same time, a traffic light positioned in middle of the intersection may be configured to identify each of the vehicles, calculate a desired order of priority of the vehicles, and relay the order to each vehicle to allow the vehicles to proceed in a safe and efficient manner.

While many autonomous and non-autonomous vehicles are equipped with communication equipment that relay vehicle information and data to a receiver, the communication technology currently used in vehicles involves radio frequency communication, such as cellular wireless technology using a Global System for Mobile Communications (GSM) network, a Long-Term Evolution (LTE) network and the like. Such technology requires a cellular tower to act as an intermediary relay to receive and transmit signals between vehicles and nearby vehicles or infrastructure. Using a central connection point requires extra time, which not only affects the efficiency of the communication system but can result in safety issues within the autonomous driving system. Additionally, system failures of central connection points due to external forces, such as weather, power failures or other unforeseen circumstances can affect the communication of an entire wireless networks. Further, such communication can be more prone to malicious attacks, as the radio signal can be intercepted and modified from far distances using various methods and equipment employed by bad actors.

Optical communication offers an ideal connection alternative. Optical communication offers data transfer rates that exceed the rate used by currently available dedicated short-range communication (DSRC) and offer a direct connection that does not rely on an external network. As they rely on direct line-of-sight communication, distant bad actors have limited access to such communications. Thus, these systems are a desirable alternative to currently employed communication systems for autonomous and "smart" vehicles.

These communication networks are already being implemented in public transportation systems, such as public bus systems. Public transportation is often characterized by fixed routes and larger vehicles, which allow for optical communication equipment to be placed at a raised height when compared to shorter vehicles. This enables farther line-of-sight distances to be used, along with a lower likelihood of obstruction from nearby vehicles or objects. Additionally, these large vehicles can easily host a central controller, which can be accessed by various nearby vehicles and infrastructure, while remaining mobile. However, some of the currently available optical communication systems are inefficient in their implementation, particularly with using directionally unfocused optical beams, as the optical sensors and sources are required to constantly scan wide angles in order to successfully transmit or receive optical signals. As public transportation vehicles use known routes with pre-determined turns and directions, a more efficient implementation is possible.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for optimizing optical communication for autonomous vehicles, including: determining a predetermined route of a vehicle equipped with an optical communication device (OCD) including an array of micromirrors; determining a location of at least one infrastructure unit along the predetermined route; determining optimal angles for the array of micromirrors based on the predetermined route and the determined location of the at least one infrastructure unit to optimize optical communication between the OCD and the at least one infrastructure unit; and adjusting the array of micromirrors based on the determined optimal angles.

Certain embodiments disclosed herein also include a non-transitory computer readable medium having stored thereon instructions for causing a processing circuitry to perform a process, the process including: determining a predetermined route of a vehicle equipped with an optical communication device (OCD) including an array of micromirrors; determining a location of at least one infrastructure unit along the predetermined route; determining optimal angles for the array of micromirrors based on the predetermined route and the determined location of the at least one infrastructure unit to optimize optical communication between the OCD and the at least one infrastructure unit; and adjusting the array of micromirrors based on the determined optimal angles.

Certain embodiments disclosed herein also include a system for optimizing optical communication for autonomous vehicles, including: a processing circuitry; and a memory, the memory containing instructions that, when executed by the processing circuitry, configure the system to: determine a predetermined route of a vehicle equipped with an optical communication device (OCD) including an array of micromirrors; determine a location of at least one infrastructure unit along the predetermined route; determine optimal angles for the array of micromirrors based on the predetermined route and the determined location of the at least one infrastructure unit to optimize optical communication between the OCD and the at least one infrastructure unit; and adjust the array of micromirrors based on the determined optimal angles.

Certain embodiments disclosed herein also include an optical communication device (OCD), including: an optical transmitter configured to transmit light pulses; an optical receiver configured to receive light pulses; at least one micromirror, where a position of the at least one micromirror is adjusted using a micro-electromechanical system (MEMS); and a processing circuitry configured to control the MEMS based on a predetermined route.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
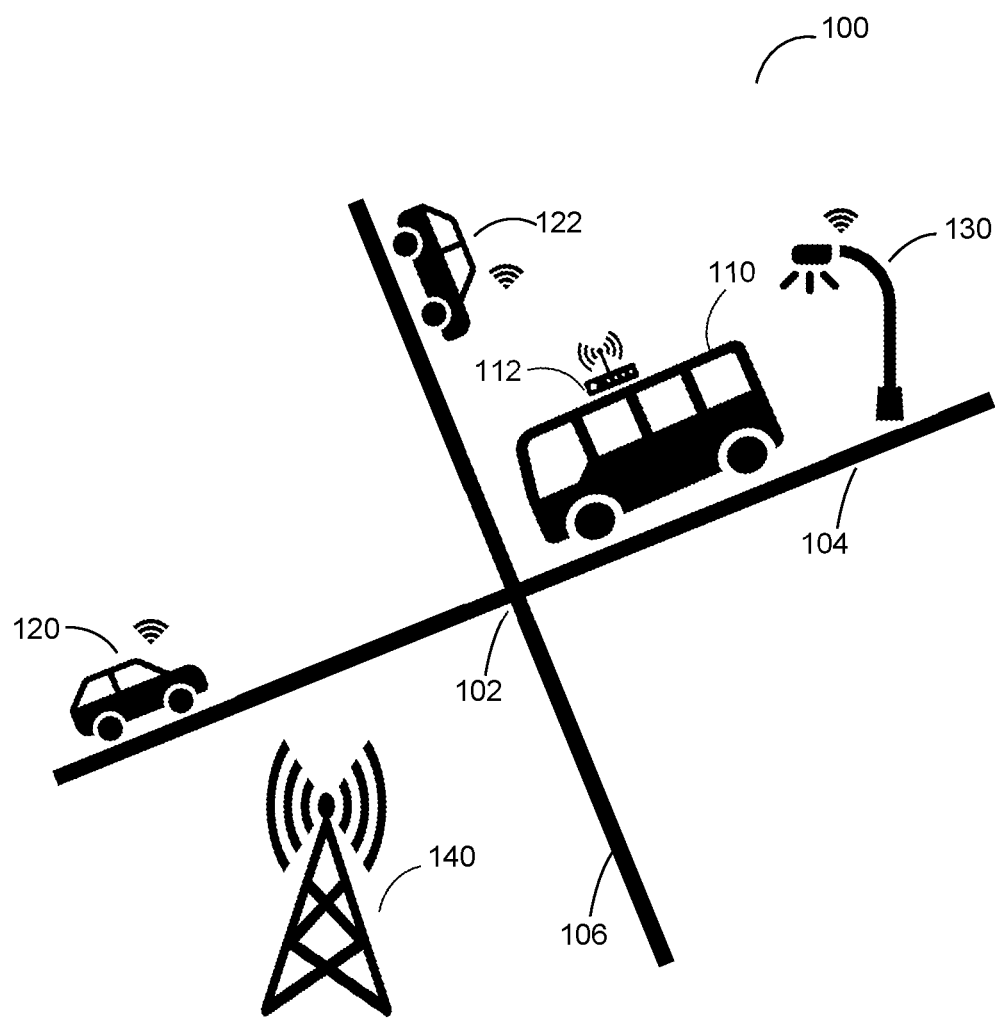
FIG. 1 shows a schematic diagram of an intersection with various vehicles and infrastructure units as an example scenario where the disclosed communication method is employed.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows a schematic diagram 100 of an intersection 102 with various vehicles and infrastructure units as an example scenario where the disclosed embodiments may be employed. The intersection 102 is formed at the juncture between a first road 104 and a second road 106. A public transportation vehicle, such as, but not limited to, a bus 110, is driving along the first road 104. The bus 110 is equipped with an optical communication device (OCD) 112 that may be mounted, for example, on the roof, allowing for an elevated position for the transmission and reception of optical signals. The OCD 112 is configured to communicate with nearby vehicles 120 and 122 and infrastructure, such as streetlights 130 and dedicated communication towers 140, using optical pulses. In an embodiment, the OCD 112 is configured to operate using infrared light in addition to, or in place of, visible light.

The OCD 112 may include one or more light emitting diodes (LEDs) and an optical receiver, where the LEDs are configured to pulse in a manner that an optical receiver on another vehicle or infrastructure unit can detect the pulse. A processor may be coupled to the optical receiver and configured to translate the received optical pulses into data, such as a textual string or signature. In an embodiment, each vehicle includes a receiver, and the vehicles 110, 120, and 122 communicate directly with each other over visible light communication (VLC). In a further embodiment, the communication tower 140 or streetlight 130 include a receiver and are able to receive and transmit data over VLC.

In an embodiment, the OCD 112 is further configured to operate over a plurality of independent wavelengths, allowing communication with several devices simultaneously and providing different information to each device. For example, the OCD 112 may include a dual wavelength emitter configured to transmit a first wavelength for communication with other vehicles and a second wavelength for communication with infrastructure units. Additionally, the OCD 112 may include filters that limit and control the wavelengths emitted such that vehicle optical communications are transmitted over a first filtered wavelength, and infrastructure optical communications are transmitted over a second filtered wavelength. A filter allows the OCD 112 to communicate over two or more dedicated wavelengths using a single source of light.

In a further embodiment, the OCD 112 may include one or more micromirrors to transmit light to a specific direction or angle. Micromirrors are small mirrors connected to microelectromechanical systems (MEMS), where the positioning of the mirrors can be precisely adjusted as desired. In an example embodiment, the mirrors can be adjusted to transmit an optical beam in the direction of a known infrastructure device. As explained in further detail below, this can be particularly useful when applied to a VLC system implemented on a public transportation vehicle, such as a bus or a train.

In further embodiments, a vehicular mesh system (not shown) is implemented, where, for example, a first vehicle is connected to a second vehicle, and where the second vehicle is connected to a third vehicle. The first vehicle can communicate with the third vehicle via the second vehicle. As an example embodiment, the bus 110 is configured to allow surrounding vehicles to communicate to other vehicles or infrastructure using optical signals, such as VLC, via a receiver and transmitter (both not shown) installed on the bus 110. It should be appreciated that the elevated height of the bus 110 may offer an ideal placement of a central receiving and transmitting optical device.

Figure 2:
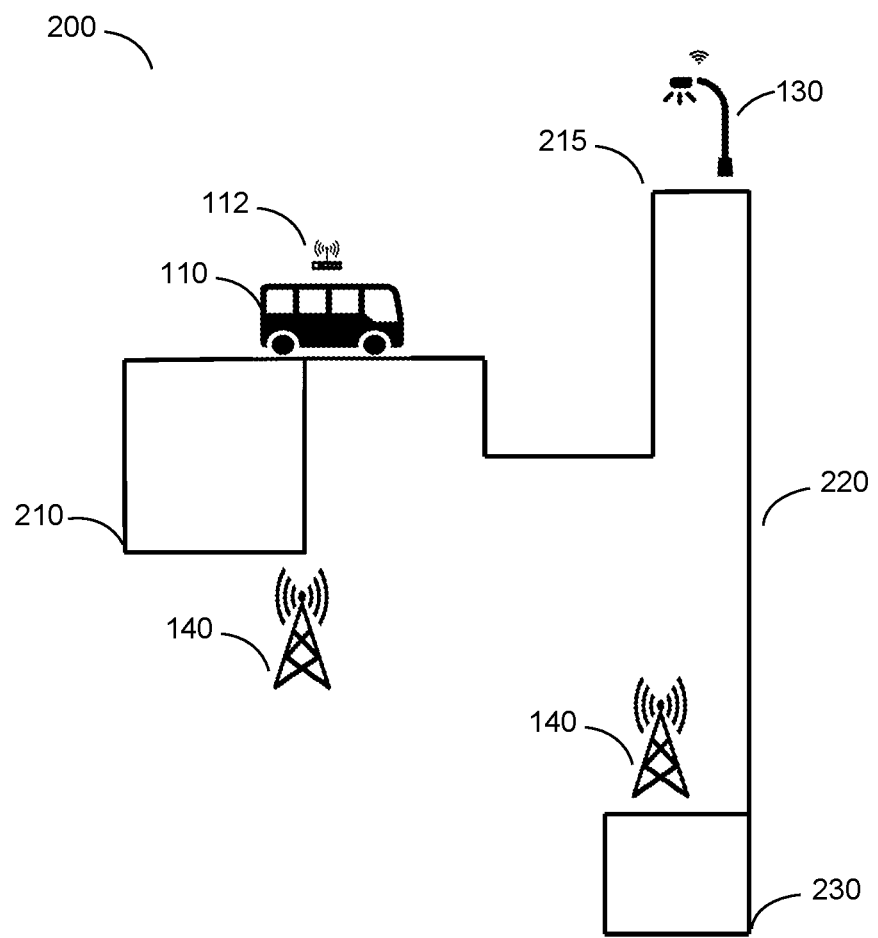
FIG. 2 is a schematic diagram of a bus route as an example scenario where the disclosed communication method is employed.

FIG. 2 is a schematic diagram of a bus route 200 as an example scenario where the disclosed communication method is employed. It should be noted that while a public transportation route is used as an example, application of the disclosed embodiment is not meant to be limited to public transportation, and may be implemented in other predetermined routes, such as routes taken by a school bus, routes taken by a mail delivery vehicle, routes taken by a patrol car, and the like.

The bus route 200 includes a starting point 210 and an ending point 230. Since a public transportation route is known in advance, the location of various infrastructure units, such as communication towers 140 and streetlights 130, and their distances from the vehicle along the route is a known variable, which allows for solving communication handoff issues more easily.

In an embodiment, the public transportation vehicle, e.g., the bus 110, serves as a mobile relay station, which can provide backup to a vehicle-infrastructure connection. The OCD 112 can be configured to recognize and anticipate upcoming nearby infrastructure units based on a current vehicle speed and location along the route. For example, based on a known average travel speed, it can be determined that the bus 110 will pass by a first communication tower 140 within 5 minutes of starting its route. A transmission of a message may be most efficient when relayed at that time, as the distance between the bus 110 and the communication tower 140 may be the closest at that point along the route.

Additionally, micromirrors within the OCD 112 can be configured to direct an optical source used as optical signals, e.g., via VLC, directly toward a receiving unit. For example, as the bus 110 completes a turn at a known point 215 along its route, the micromirrors of the OCD 112 may be adjusted to direct light from the OCD 112 toward a nearby streetlight 130. Further, based on the known bus route and estimated travel time, it can be determined that the bus 110 will be traveling along a stretch of highway 220 approximately 35 minutes into its route, and thus the micromirrors of the OCD 112 can be directed toward the road, either in front or behind the bus 110 to detect or transmit optical signals to nearby vehicles sharing the road. The positioning of the micromirrors is adjusted, e.g., their yaw, pitch, and roll, as well as the timing of the adjustments, based on estimations or on previously collected travel data. The data may be collected from previous trips and stored in an accessible database, e.g., a cloud-based database. The previously collected travel data may include data from the same vehicle, e.g., the bus 110, or from other vehicles travelling the same route, e.g., along the same stretch of highway 220.

Further, communication handoffs between various infrastructure units may be anticipated and executed based on optical signal strength and route location. In an embodiment, machine learning is implemented to determine optimal handoffs protocol based on previously recorded communications. In an embodiment, machine learning techniques employed include implementation of one or more neural networks, recurrent neural networks, decision tree learning, Bayesian networks, clustering, and the like, based on the data inputs, e.g., data from multiple vehicles.

Thus, the implementation of optical signals, e.g., VLC, within a known route, such as a route used for public transportation allows for a number of advantages. The known location of the OCD 112 can be used for warning nearby vehicles of upcoming hazardous situations, such as accidents, traffic, and obstacles. Further, the location of both the bus 110, as well as surrounding vehicles allows for real-time merging assistance information to be transmitted to all relevant vehicles and nearby infrastructure. Additionally, priority assignment for vehicles, such as when approaching an intersection, can be determined, and communicated using the up to date positioning of the OCD 112.

It should be noted that while the disclosed embodiments discuss bus routes, the method herein is not meant to be limited to such implementations and may be applied to other scenarios with known or partially-known routes.

Figure 3:
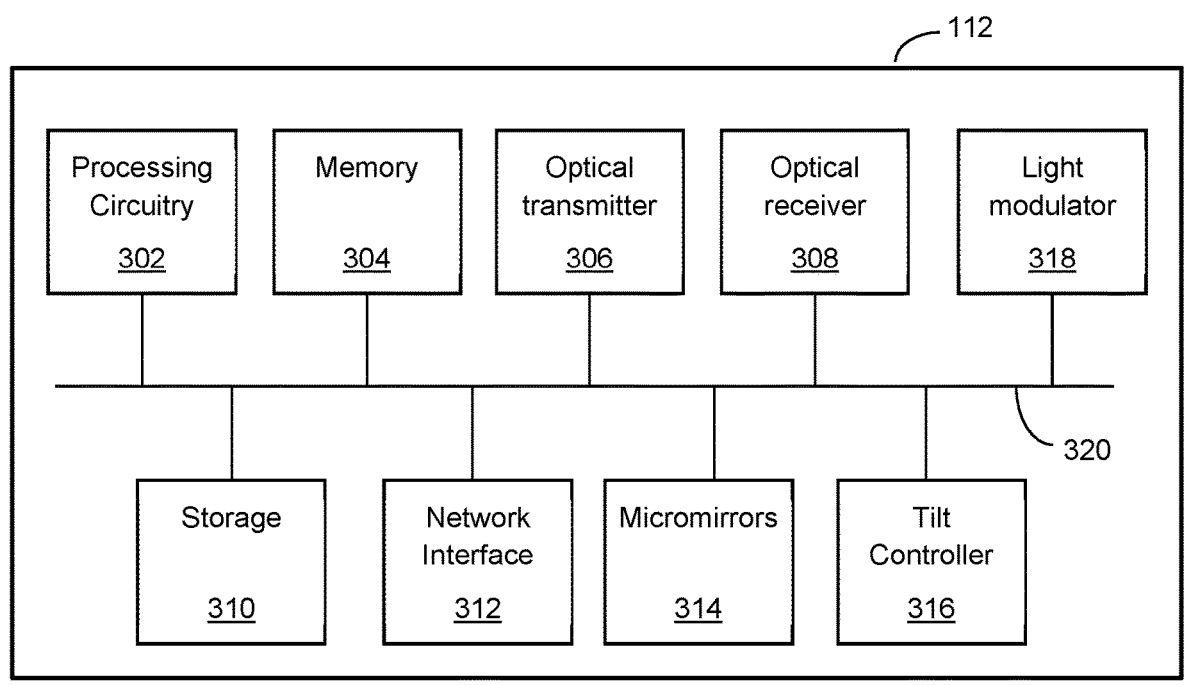
FIG. 3 is an example block diagram of an optical communication device according to an embodiment.

FIG. 3 is an example block diagram of an OCD 112 according to an embodiment. The OCD 112 includes a processing circuitry 302 connected to a memory 304, at least one optical transmitter 306, at least one optical receiver 308, a storage 310, and a network interface 312. In an embodiment, the OCD 112 further includes one or more micromirrors 314 configured to allow adjustment of the micromirrors' positioning. The micromirrors 314 may form one or more arrays of micromirrors where the micromirrors contained therein either act in concert with each other, or independently thereof. In a further embodiment, the OCD 112 includes a tilt controller 316 to control the micromirrors 314 or the array of micromirrors. The components of the OCD 112 may be communicatively connected via a bus 320.

The processing circuitry 302 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In another embodiment, the memory 304 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 302 to perform the various optical communication methods disclosed herein. In addition, the instructions may include determining a travel route, updating parameters related to a travel route, updating location information of infrastructure units, determining optimal angles of the micromirrors, and the like.

The storage 310 may be magnetic storage, optical storage, and the like, and may be realized, for example, as flash memory or other memory technology, hard-drives, SSD, or any other medium which can be used to store the desired information. The storage 306 may store one or more random numbers, vehicles identification tags, and the like.

The network interface 312 is configured to allow the OCD 112 to communicate with the various vehicles and infrastructure via optical signals, such as VLC. As discussed above, the OCD 112 may be installed on a vehicle, on an infrastructure unit, on both, and the like. In an embodiment, the network interface includes a wireless interface configured to connect the OCD 112 with a user device, such as a smartphone, or a vehicle computer, e.g., an on-board computer of a car. The wireless interface may include Wi-Fi, Bluetooth®, Bluetooth Low Energy (BLE), and the like.

The optical transmitter 306 includes one or more light sources (not shown), such as LED lights or lasers, as discussed above. In an embodiment, an array of LED lights or lasers is included within the optical transmitter 306. The lights are configured to produce short and powerful pulses of light than can be focused via a lens, such as a Fresnel lens, toward a desired location. In an embodiment, the optical transmitter 306 is connected to a power source (not shown), such as a dedicated battery or vehicular energy source. The optical receiver 308 is configured to detect light pulses sent from other OCD units, either those installed on infrastructure units or on nearby vehicles. The received light pulses are decoded using the processing circuitry to analyze incoming traffic and vehicle information.

In an embodiment, the micromirrors 314 or the array of micromirrors are configured to direct light or light pulses from the optical transmitter 306 to an external receiver, e.g., a receiving mounted to an infrastructure unit (not shown). In a further embodiment, the micromirrors 314 or the array of micromirrors are further configured to direct a received light or light pulses, e.g., from an external transmitter of an infrastructure unit, to the optical receiver 308. The positioning of the micromirrors 314 is controlled using a microelectromechanical system (MEMS), which is an electromechanical system with physical dimensions in the range of several microns, or micrometers, to several millimeters, and may include microscopic versions of mechanical systems, such as gears, motors, cantilevers, and the like. The MEMS can control the direction of reflection of the micromirrors 314 or array of micromirrors, e.g., of transmitting light source, or a received light source.

In a further embodiment, the OCD 112 includes a tilt controller 316 configured to control the position on the micromirrors 314. In an embodiment, the tilt mechanism 316 is employed in addition to the MEMS. The tilt mechanism 316 may include a stage, such as a compact multi-axis stage configured to adjust each individual micromirror 314 or an array of micromirrors relative to at least one of: yaw, roll, pitch, an x-axis, a y-axis, and a z-axis.

In an embodiment, the OCD 112 further includes a light modulator 318 configured to manipulate light pulses transmitted from the optical transmitter 308 of the OCD 112. The light modulator 318 may include a dual wavelength emitter configured to split a light source from the optical transmitter 306 into two or more wavelength. A first wavelength may be assigned for communication between the OCD 112 and a vehicle, while a second wavelength may be assigned for communication between the OCD 112 and an infrastructure unit. In a further embodiment, the light modulator 318 includes a wavelength filter configured to limit light output from the optical transmitter 306 to one or more wavelengths, which may be each assigned for communication between the OCD 112 and a vehicle or an infrastructure unit.

In yet a further embodiment, the OCD 112 further includes a position sensing detector (not shown) configured to determine a position of a target, e.g., an external transmitter of an infrastructure unit, based on a photo sensor input. The MEMS of the micromirrors 314, the tilt controller 316, or both can adjust the positioning of the micromirrors to optimize incident angles of the micromirrors 314 based on the determined position of the target.

In an embodiment, the OCD 112 further includes a retroreflector configured to reflect light pulses received from an external transmitter, e.g., from an infrastructure unit, back to the external transmitter with minimal scattering and signal loss. The micromirrors 314 a further configured to reflect a portion of the received light pulses to the optical receiver 308 while reflecting the remaining portion of the light pulses back to the retroreflector.

Figure 4:
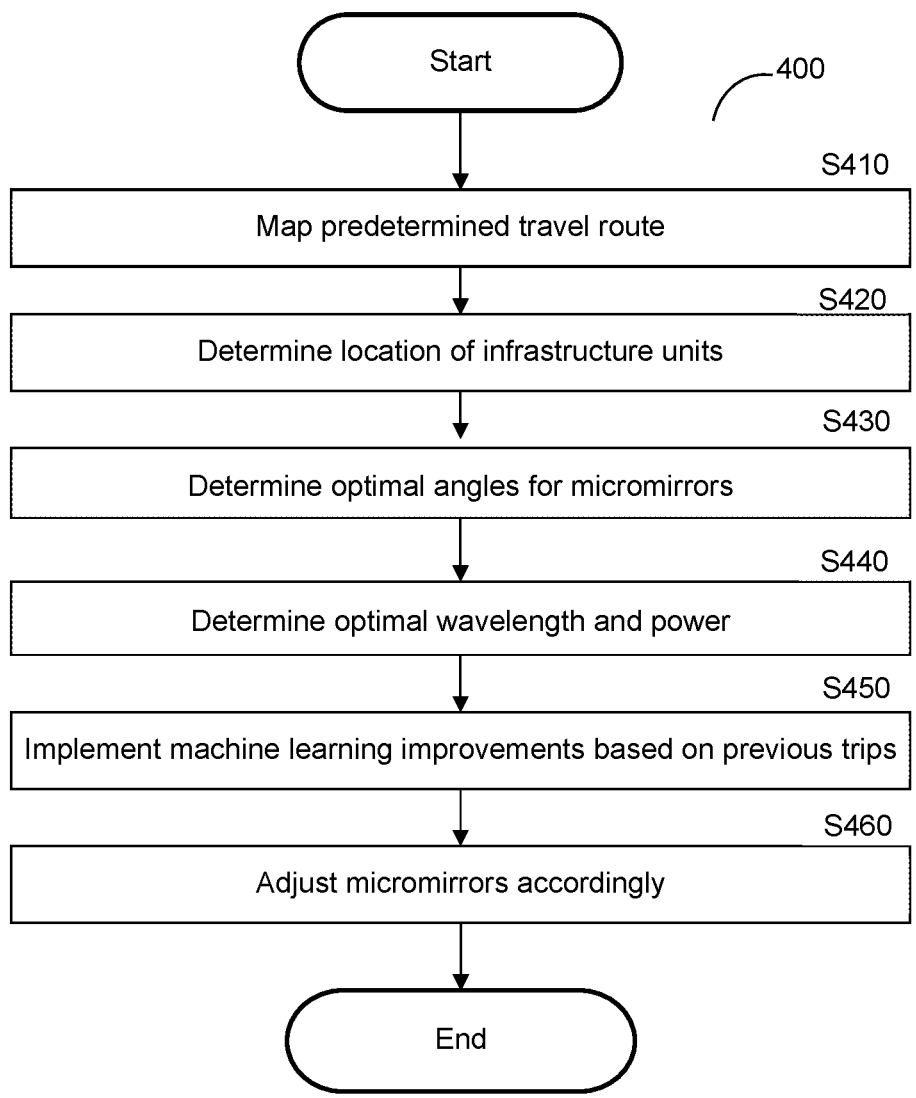
FIG. 4 is an example flowchart of a method of optimizing visible light communication for public transportation.

FIG. 4 is an example flowchart 400 of a method of optimizing optical communication for autonomous vehicles.

At S410, a predetermined travel route is mapped. This includes determining the length of a predetermined route, such as a route taken by a public transportation vehicle, e.g., a bus or a train, estimating the time of travel along various sections of the route, and clarifying what directions the public transportation vehicle much follow. In an embodiment, the travel route is mapped by accessing route information, e.g., from a public transportation authority website. In addition, various real-time updates may be considered. For example, detours and traffic delays can be accessed, e.g., from the Internet or real-time data sharing apps running on user devices on board a vehicle and incorporated into the travel route. In an embodiment, the vehicle includes an optical communication device (OCD) including an array of micromirrors configured to focus a transmitting optical signal in a particular direction or receive an optical signal from a particular direction.

At S420, the locations of various infrastructure units are determined. For example, if various communication towers, streetlights, and the like, which are equipped with optical communication devices are known to be located on or near the travel route, their location along the route is determined to allow an OCD of a vehicle travelling along the route to plan when to communicate with each unit at the most appropriate time. A point along the route that is closest to the infrastructure unite and that has an unobstructed view from the travel route location may be identified to ensure successful communication.

At S430, optimal angles for the array of micromirrors are determined based on the travel route and the determined location of infrastructure units to optimize optical communication. The determination of the optimal angles may include optimal angels for the entire array of micromirrors, or optimal angles for some of the micromirrors within the array. In an embodiment, the array of micromirrors is used by an OCD unit, as discussed herein. Optimal angles allow the micromirrors to be adjusted based on the vehicle location and the location of the infrastructure units. For example, if an infrastructure unit is placed just beyond an upcoming righthand turn, the micromirrors can be configured to adjust their position based on the anticipated turn to focus transmitted pulses on the infrastructure unit, as well as to receive sent pulses. This allows for a more accurate and precise positioning of the mirrors to enable more reliable optical communication.

At S440, an optimal wavelength and power for transmission signals from the OCD is determined. For example, if a second infrastructure unit is located at a father distance than a first infrastructure unit, the power of the light pulses from the OCD must be increased relative to the first transmission to guarantee successful transmission. Likewise, certain wavelengths may be more desirable than others depending on the specific receiving unit.

At optional S450, machine learning may be implemented to improve the determined travel route, location of infrastructure units, optimal angles of the micromirrors, and optimal wavelength and power of a transmitting light pulse. In a non-limiting example, the parameters of these settings are saved and stored in a database. After completing each route, the previously determined route parameters can be updated. A machine learning algorithm may be implemented to further optimize and improve the configuration based on the updated information. Thus, any changes to the travel route, however minor, can be taken into account and used to improve the optical communications of the OCD based on previous and anticipated changes. In an embodiment, machine learning techniques employed include implementation of one or more neural networks, recurrent neural networks, decision tree learning, Bayesian networks, clustering, and the like, based on the data inputs, e.g., data from multiple vehicles.

At S460, the micromirrors of the OCD are adjusted based on the determined optimal angles, the determined optimal wavelength and power, the machine learning implemented improvements, and any combination thereof.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing optical communication for autonomous vehicles, comprising:
   determining a predetermined route of a vehicle equipped with an optical communication device (OCD) including an array of micromirrors;
   determining a location of at least one infrastructure unit along the predetermined route;
   determining angles required for the array of micromirrors based on the predetermined route, the determined location of the at least one infrastructure unit, and a speed of the vehicle to facilitate optical communication between the OCD and the at least one infrastructure unit; and
   adjusting the array of micromirrors based on the determined angles.

2. The method of claim 1, wherein communication handoffs between the vehicle and multiple infrastructure units are executed based on optical signal strength and route location.

3. The method of claim 2, wherein the communication handoffs are based on machine learning techniques including at least one of: a neural network, a recurrent neural network, decision tree learning, a Bayesian network, and clustering.

4. The method of claim 1, further comprising:
   determining a required wavelength and a power level for transmission signals from the OCD; and
   adjusting the array of micromirrors based on the determined required wavelength and the power level.

5. The method of claim 1, further comprising:
   anticipating an upcoming at least one infrastructure unit based on a current speed of the vehicle and a current location of the vehicle along the predetermined route.

6. The method of claim 1, wherein the angles required for the array of micromirrors are determined based on the predetermined route and the determined location of the at least one infrastructure unit located within an access range of the predetermined route.

7. The method of claim 1, wherein adjusting the array of micromirrors includes adjusting at least one of a yaw, a pitch, and a roll of the array of micromirrors.

8. The method of claim 1, wherein adjusting the array of micromirrors, is based on previously collected travel data from at least one of: the vehicle and other vehicles that previously travelled along the predetermined route.

9. The method of claim 1, wherein the predetermined route of the vehicle equipped with an OCD is a public transportation route.

10. A non-transitory computer readable medium having stored thereon instructions for causing a processing circuitry to perform a process, the process comprising:
    determining a predetermined route of a vehicle equipped with an optical communication device (OCD) including an array of micromirrors;
    determining a location of at least one infrastructure unit along the predetermined route;
    determining angles required for the array of micromirrors based on the predetermined route, the determined location of the at least one infrastructure unit, and a speed of the vehicle to facilitate optical communication between the OCD and the at least one infrastructure unit; and
    adjusting the array of micromirrors based on the determined angles.

11. A system for optimizing optical communication for autonomous vehicles, comprising:
    a processing circuitry; and
    a memory, the memory containing instructions that, when executed by the processing circuitry, configure the system to:
    determine a predetermined route of a vehicle equipped with an optical communication device (OCD) including an array of micromirrors;
    determine a location of at least one infrastructure unit along the predetermined route;
    determine angles required for the array of micromirrors based on the predetermined route, the determined location of the at least one infrastructure unit, and a speed of the vehicle to facilitate optical communication between the OCD and the at least one infrastructure unit; and
    adjust the array of micromirrors based on the determined angles.

12. The system of claim 11, wherein communication handoffs between the vehicle and multiple infrastructure units are executed based on optical signal strength and route location.

13. The system of claim 12, wherein the communication handoffs are based on machine learning techniques including at least one of: a neural network, a recurrent neural network, decision tree learning, a Bayesian network, and clustering.

14. The system of claim 11, wherein the system is further configured to:
determine a wavelength and a power level required for transmission signals from the OCD; and
adjust the array of micromirrors based on the determined wavelength and the power level.

15. The system of claim 11, wherein the system is further configured to:
anticipate an upcoming at least one infrastructure unit based on a current speed of the vehicle and a current location of the vehicle along the predetermined route.

16. The system of claim 11, wherein the angles required for the array of micromirrors are determined based on the predetermined route and the determined location of the at least one infrastructure unit located within an access range of the predetermined route.

17. The system of claim 11, wherein the system is further configured to:
adjust at least one of a yaw, a pitch, and a roll of the array of micromirrors.

18. The system of claim 11, wherein the system is further configured to:
adjust the array of micromirrors based on previously collected travel data from at least one of: the vehicle and other vehicles that previously travelled along the predetermined route.

19. The system of claim 11, wherein the predetermined route of the vehicle equipped with an OCD is a public transportation route.

20. The system of claim 11, wherein the OCD includes a dual wavelength emitter configured to transmit a first wavelength for communication with other vehicles and a second wavelength for communication with at least one infrastructure unit.

21. The system of claim 11, wherein the OCD includes at least one filter configured to control wavelengths emitted from the OCD such that vehicle optical communications are transmitted over a first filtered wavelength, and infrastructure optical communications are transmitted over a second filtered wavelength.

* * * * *